(12) United States Patent
Yamazaki et al.

(10) Patent No.: US 9,288,415 B2
(45) Date of Patent: Mar. 15, 2016

(54) SOLID-STATE IMAGING APPARATUS AND IMAGING SYSTEM

(71) Applicant: CANON KABUSHIKI KAISHA, Tokyo (JP)

(72) Inventors: Kazuo Yamazaki, Yokohama (JP); Tetsuya Itano, Sagamihara (JP); Hiroki Hiyama, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/469,715

(22) Filed: Aug. 27, 2014

(65) Prior Publication Data

US 2015/0077607 A1 Mar. 19, 2015

(30) Foreign Application Priority Data

Sep. 17, 2013 (JP) ................................. 2013-192366

(51) Int. Cl.
*H04N 5/378* (2011.01)
*H04N 5/3745* (2011.01)

(52) U.S. Cl.
CPC ........... *H04N 5/378* (2013.01); *H04N 5/37455* (2013.01); *H04N 5/37457* (2013.01)

(58) Field of Classification Search
None
See application file for complete search history.

(56) References Cited

U.S. PATENT DOCUMENTS

| | | |
|---|---|---|
| 6,188,094 B1 | 2/2001 | Kochi et al. |
| 6,605,850 B1 | 8/2003 | Kochi et al. |
| 6,670,990 B1 | 12/2003 | Kochi et al. |
| 6,946,637 B2 | 9/2005 | Kochi et al. |
| 6,960,751 B2 | 11/2005 | Hiyama et al. |
| 7,110,030 B1 | 9/2006 | Kochi et al. |
| 7,126,102 B2 | 10/2006 | Inoue et al. |
| 7,187,052 B2 | 3/2007 | Okita et al. |
| 7,283,305 B2 | 10/2007 | Okita et al. |
| 7,321,110 B2 | 1/2008 | Okita et al. |
| 7,385,172 B2 | 6/2008 | Inoue et al. |
| 7,408,210 B2 | 8/2008 | Ogura et al. |
| 7,429,764 B2 | 9/2008 | Koizumi et al. |
| 7,460,162 B2 | 12/2008 | Koizumi et al. |
| 7,462,810 B2 | 12/2008 | Kobayashi et al. |
| 7,531,885 B2 | 5/2009 | Okita et al. |
| 7,538,804 B2 | 5/2009 | Okita et al. |
| 7,547,871 B2 | 6/2009 | Hiyama et al. |
| 7,550,793 B2 | 6/2009 | Itano et al. |
| 7,557,847 B2 | 7/2009 | Okita et al. |

(Continued)

FOREIGN PATENT DOCUMENTS

| | | |
|---|---|---|
| JP | 2008-167004 A | 7/2008 |
| JP | 2010-147614 A | 7/2010 |

OTHER PUBLICATIONS

Mar. 9, 2015 Combined Search and Examination Report under Sections 17 and 18(3) in corresponding Application No. GB1416138.4.

*Primary Examiner* — Michael Osinski
(74) *Attorney, Agent, or Firm* — Fitzpatrick, Cella, Harper & Scinto

(57) ABSTRACT

A solid-state imaging apparatus includes a pixel section in which a plurality of pixels are arranged in a matrix, a column signal line configured to output a pixel signal from the pixel section, a column amplifier circuit configured to invert and amplify the pixel signal, a bypass circuit configured to bypass the column amplifier circuit, an AD converter, and a control unit configured to change an operation mode of the AD converter in accordance with the operation of the bypass circuit.

8 Claims, 10 Drawing Sheets

(56) References Cited

U.S. PATENT DOCUMENTS

| | | |
|---|---|---|
| 7,592,579 B2 | 9/2009 | Tamura et al. |
| 7,638,826 B2 | 12/2009 | Hiyama et al. |
| 7,646,493 B2 | 1/2010 | Okita et al. |
| 7,709,780 B2 | 5/2010 | Inoue et al. |
| 7,719,587 B2 | 5/2010 | Ogura et al. |
| 7,741,593 B2 | 6/2010 | Iwata et al. |
| 7,755,688 B2 | 7/2010 | Hatano et al. |
| 7,812,873 B2 | 10/2010 | Hiyama et al. |
| 7,812,876 B2 | 10/2010 | Hiyama et al. |
| 7,825,974 B2 | 11/2010 | Itano et al. |
| 7,903,160 B2 * | 3/2011 | Taguchi ............... H04N 5/335 348/308 |
| 7,920,192 B2 | 4/2011 | Watanabe et al. |
| 7,961,237 B2 | 6/2011 | Hatano et al. |
| 7,978,241 B2 | 7/2011 | Koizumi et al. |
| 7,982,789 B2 | 7/2011 | Watanabe et al. |
| 8,023,025 B2 | 9/2011 | Itano et al. |
| 8,045,034 B2 | 10/2011 | Shibata et al. |
| 8,063,351 B2 | 11/2011 | Kobayashi et al. |
| 8,063,958 B2 | 11/2011 | Okita et al. |
| 8,063,967 B2 | 11/2011 | Itano et al. |
| 8,081,245 B2 | 12/2011 | Itano et al. |
| 8,085,319 B2 | 12/2011 | Ono et al. |
| 8,089,530 B2 | 1/2012 | Mabuchi |
| 8,106,955 B2 | 1/2012 | Okita et al. |
| 8,120,686 B2 | 2/2012 | Hatano et al. |
| 8,124,922 B2 * | 2/2012 | Koyama ............... G01J 1/4204 250/214 R |
| 8,159,577 B2 | 4/2012 | Iwata et al. |
| 8,174,604 B2 | 5/2012 | Shibata et al. |
| 8,208,055 B2 | 6/2012 | Hiyama |
| 8,218,050 B2 | 7/2012 | Ogura et al. |
| 8,289,431 B2 | 10/2012 | Itano |
| 8,325,260 B2 | 12/2012 | Yamazaki et al. |
| 8,355,066 B2 | 1/2013 | Iwata et al. |
| 8,363,137 B2 | 1/2013 | Sonoda et al. |
| 8,368,790 B2 | 2/2013 | Itano et al. |
| 8,390,708 B2 | 3/2013 | Koizumi et al. |
| 8,400,546 B2 | 3/2013 | Itano et al. |
| 8,411,187 B2 | 4/2013 | Watanabe et al. |
| 8,416,329 B2 | 4/2013 | Hiyama et al. |
| 8,427,565 B2 | 4/2013 | Hiyama |
| 8,441,558 B2 | 5/2013 | Okita et al. |
| 8,451,360 B2 | 5/2013 | Nakamura et al. |
| 8,493,487 B2 | 7/2013 | Takada et al. |
| 8,552,481 B2 | 10/2013 | Hiyama et al. |
| 8,553,101 B2 | 10/2013 | Okita et al. |
| 8,598,901 B2 | 12/2013 | Hiyama et al. |
| 8,643,765 B2 | 2/2014 | Takada et al. |
| 8,670,049 B2 | 3/2014 | Ono et al. |
| 8,686,341 B2 * | 4/2014 | Noiret ............... H04N 5/35536 250/208.1 |
| 8,698,935 B2 | 4/2014 | Okita et al. |
| 8,711,259 B2 | 4/2014 | Maehashi et al. |
| 8,749,675 B2 | 6/2014 | Koizumi et al. |
| 8,810,706 B2 | 8/2014 | Yamazaki et al. |
| 8,823,849 B2 | 9/2014 | Hiyama et al. |
| 8,836,838 B2 | 9/2014 | Nakamura et al. |
| 9,041,583 B2 * | 5/2015 | Tanaka ................ H04N 5/3745 341/169 |
| 2002/0006232 A1 * | 1/2002 | Inui ....................... H04N 5/3575 382/278 |
| 2007/0076109 A1 * | 4/2007 | Krymski .................. H04N 5/32 348/300 |
| 2008/0174464 A1 * | 7/2008 | Robert .................. H03M 1/162 341/155 |
| 2009/0167915 A1 * | 7/2009 | Hirota ..................... H04N 5/378 347/302 |
| 2009/0310001 A1 * | 12/2009 | Masuyama ............ H04N 5/378 348/300 |
| 2010/0020217 A1 * | 1/2010 | Abe ....................... H04N 5/3591 348/308 |
| 2010/0149392 A1 | 6/2010 | Hara |
| 2011/0003426 A1 | 1/2011 | Watanabe et al. |
| 2011/0134295 A1 | 6/2011 | Shigeta et al. |
| 2011/0155890 A1 | 6/2011 | Egawa et al. |
| 2011/0254986 A1 * | 10/2011 | Nishimura ............ H01L 27/146 348/302 |
| 2012/0194716 A1 * | 8/2012 | Hagihara ............... H04N 5/378 348/300 |
| 2013/0026343 A1 | 1/2013 | Saito et al. |
| 2013/0057422 A1 * | 3/2013 | Johansson ............ H03K 5/2481 341/155 |
| 2013/0062503 A1 | 3/2013 | Saito et al. |
| 2013/0068930 A1 | 3/2013 | Nakamura et al. |
| 2013/0088625 A1 | 4/2013 | Iwata et al. |
| 2013/0235241 A1 | 9/2013 | Nakamura et al. |
| 2014/0002684 A1 | 1/2014 | Okita et al. |
| 2014/0002690 A1 | 1/2014 | Hiyama et al. |
| 2014/0036120 A1 * | 2/2014 | Hagihara ............... H04N 5/374 348/300 |
| 2014/0184844 A1 * | 7/2014 | Muto ..................... H04N 5/355 348/222.1 |
| 2014/0184865 A1 * | 7/2014 | Muto ..................... H03M 1/183 348/300 |
| 2014/0312207 A1 | 10/2014 | Ikeda et al. |
| 2014/0320717 A1 | 10/2014 | Hiyama et al. |
| 2014/0332668 A1 * | 11/2014 | Nishihara ................ H04N 5/32 250/208.1 |
| 2014/0375855 A1 * | 12/2014 | Nishihara ......... H01L 27/14603 348/301 |
| 2015/0138411 A1 * | 5/2015 | Nakamura ............ H03K 5/249 348/300 |
| 2015/0172581 A1 * | 6/2015 | Itano ..................... H04N 5/378 250/208.1 |
| 2015/0237285 A1 * | 8/2015 | Tanaka ................ H04N 5/3765 348/300 |
| 2015/0264284 A1 * | 9/2015 | Yoo ....................... H04N 5/363 250/208.1 |
| 2015/0281616 A1 * | 10/2015 | Muto ..................... H04N 5/378 348/322 |

* cited by examiner

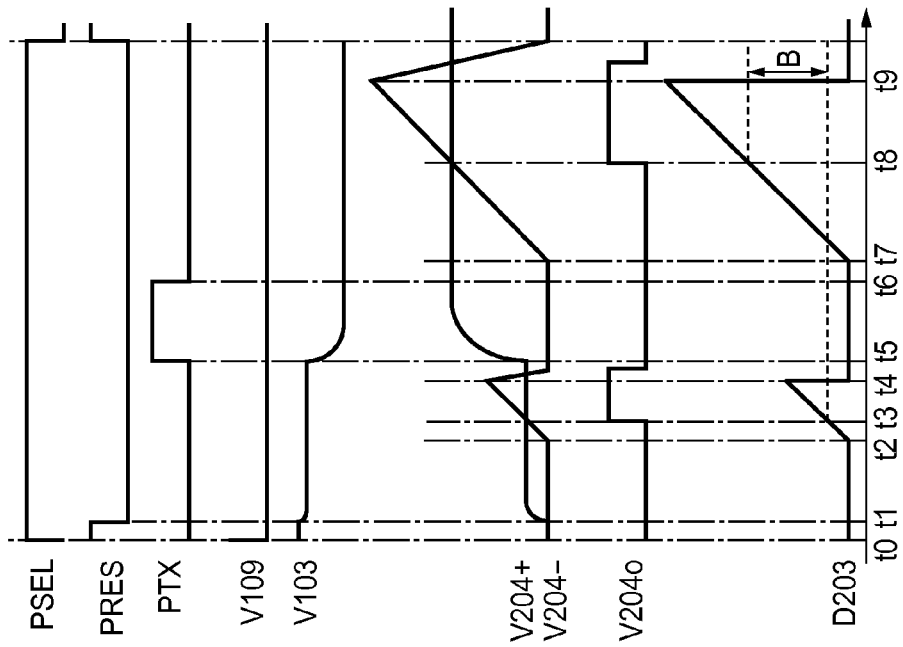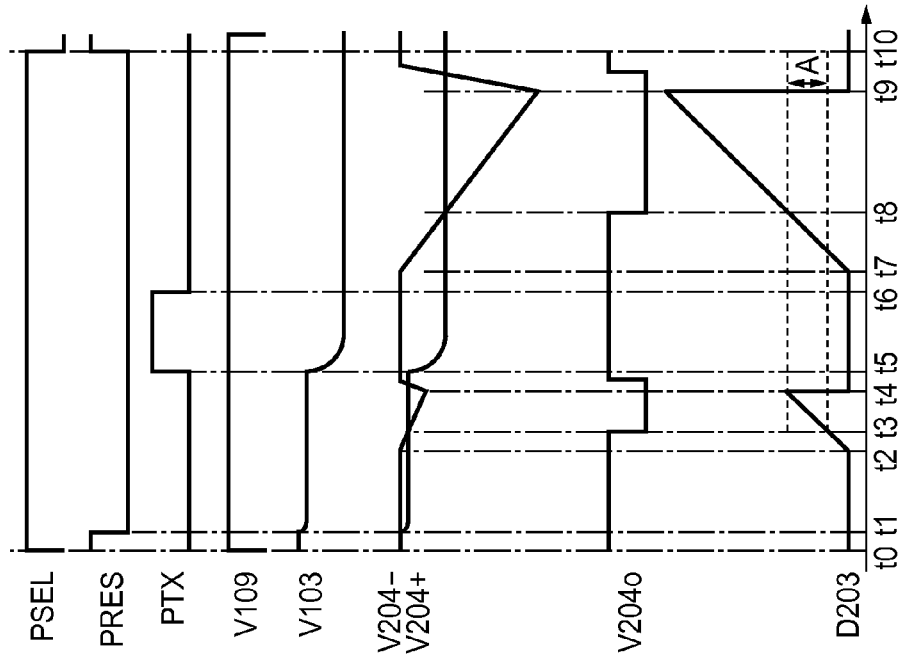

F I G. 5
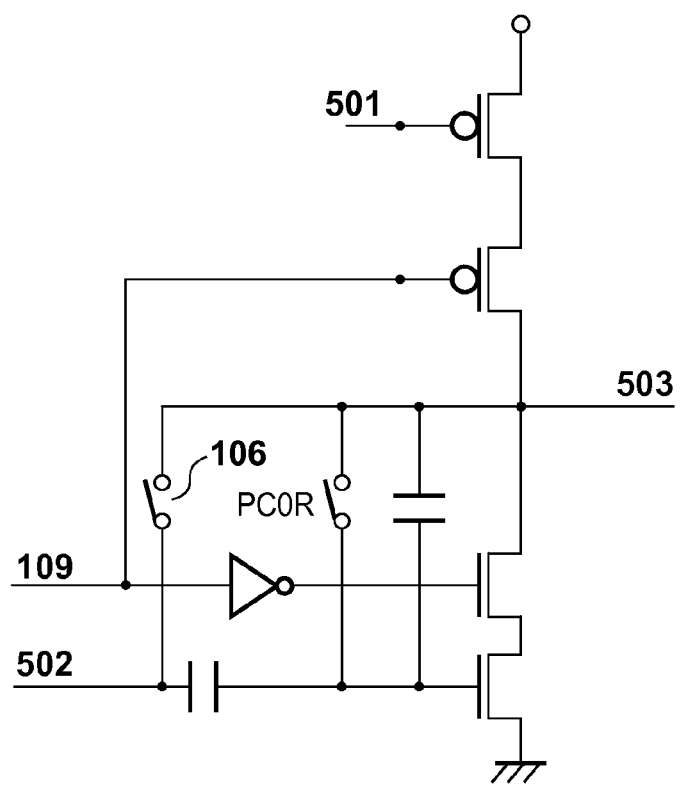

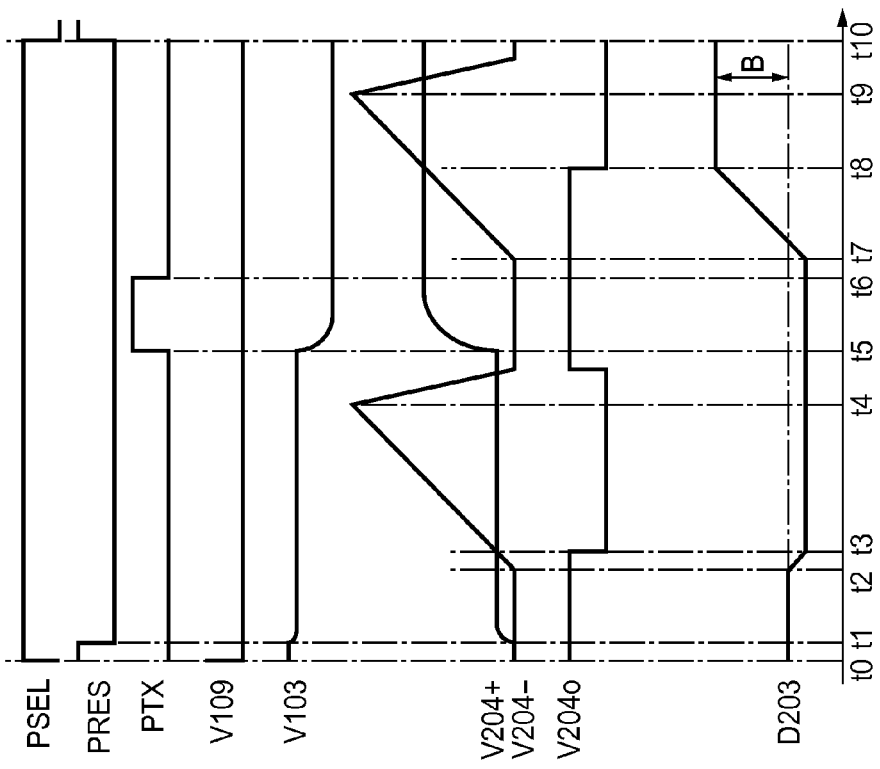
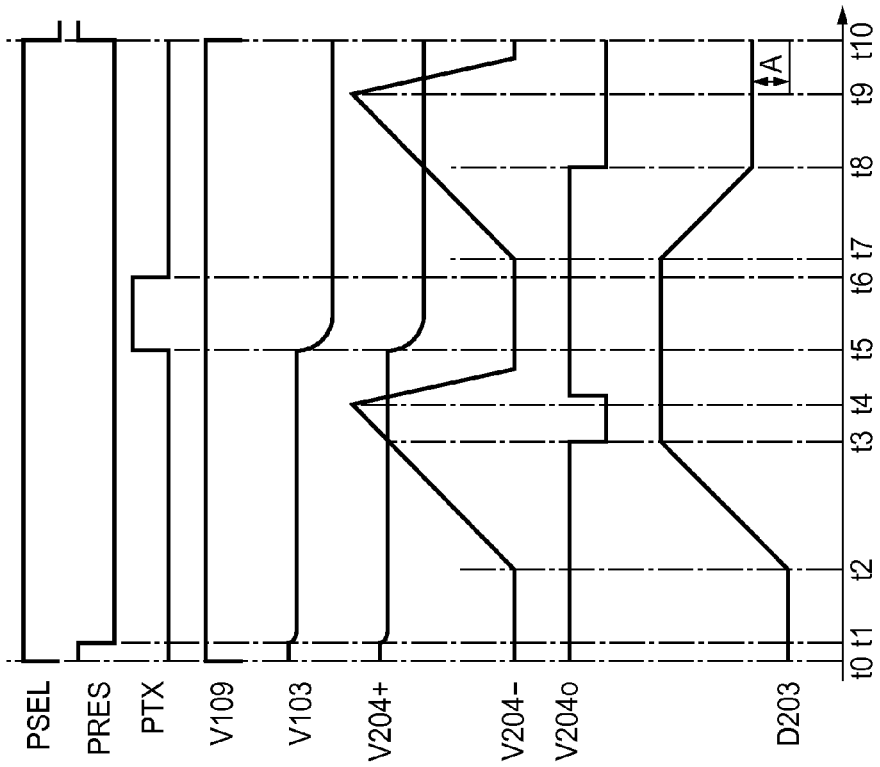

SOLID-STATE IMAGING APPARATUS AND IMAGING SYSTEM

BACKGROUND OF THE INVENTION

1. Field of the Invention

The present invention relates to a solid-state imaging apparatus including an AD conversion circuit and an imaging system.

2. Description of the Related Art

Some solid-state imaging apparatuses, for example MOS imaging apparatuses, are constituted by an imaging unit and column signal processing circuit, as described in Japanese Patent Laid-Open No. 2008-167004. Japanese Patent Laid-Open No. 2008-167004 describes an arrangement in which a column amplifier circuit and an AD (Analogue to Digital) conversion circuit are mounted in the column signal processing circuit, and AD conversion is performed for each column. This patent literature document discloses a method of amplifying signals of a plurality of systems having different sensitivities, AD-converting them, and then combining them to enlarge the dynamic range without decreasing the S/N ratio. Japanese Patent Laid-Open No. 2010-147614 describes a technique of, in a still image shooting mode, turning on an amplifier to perform high-quality shooting, and in a moving image shooting mode for a monitor, turning off the amplifier to cause a pixel signal to bypass the amplifier, thereby reducing power.

Japanese Patent Laid-Open No. 2010-147614 discloses a technique of switching the input range of an AD converter when the amplifier is turned on/off, and more specifically, halving the amplitude of a ramp waveform and a counter operation when the amplifier is OFF.

SUMMARY OF THE INVENTION

The first aspect of the present invention provides a solid-state imaging apparatus comprising a pixel section in which a plurality of pixels are arranged in a matrix, a column signal line configured to output a pixel signal from the pixel section, a column amplifier circuit configured to invert and amplify the pixel signal, a bypass circuit configured to bypass the column amplifier circuit, an AD converter, and a control unit configured to change an operation mode of the AD converter, wherein the AD converter includes a ramp signal generation circuit configured to generate a reference signal, a comparator configured to compare the reference signal and the pixel signal, and a counter configured to count a time, and output a count value corresponding to the time, and the control unit is configured to: in a first operation mode, to control the AD converter to AD-convert the pixel signal from the column signal line and bypass the column amplifier circuit by the bypass circuit, in a second operation mode, to control the AD converter to AD-convert the pixel signal inverted and amplified by the column amplifier circuit, and to change one of a slope of a ramp signal and a counting procedure of the counter between the first operation mode and the second operation mode.

The second aspect of the present invention provides a solid-state imaging apparatus comprising a pixel section in which a plurality of pixels is arranged in a matrix, a column signal line configured to output a pixel signal from the pixel section, a column amplifier circuit configured to invert and amplify the pixel signal from the column amplifier circuit, a bypass circuit configured to bypass the column amplifier circuit, a successive approximation AD converter, a CDS processing unit configured to calculate a difference between an output digital value of a reset level from the AD converter, and an output digital value of an imaging signal obtained by photo-electrically converting light, and a control unit configured to change an operation mode of the AD converter, wherein the control unit is configured: in a first operation mode, to control the AD converter to AD-convert the pixel signal from the column signal line and bypass the column amplifier circuit by the bypass circuit, in a second operation mode, to control the AD converter to AD-convert an inverted/amplified output signal from the column amplifier circuit, and to change processing of the CDS processing unit between the first operation mode and the second operation mode.

The third aspect of the present invention provides an imaging system comprising above solid-state imaging apparatus; an optical system configured to form an image on the solid-state imaging apparatus; and a signal processing circuit configured to process an output signal from the solid-state imaging apparatus.

Further features of the present invention will become apparent from the following description of exemplary embodiments (with reference to the attached drawings).

BRIEF DESCRIPTION OF THE DRAWINGS

FIGS. 4A and 4B are timing charts exemplifying a driving method according to the first embodiment;

FIG. 5 is a circuit diagram showing the circuit arrangement of a column amplifier circuit;

FIGS. 7A and 7B are timing charts exemplifying a driving method according to the second embodiment;

DESCRIPTION OF THE EMBODIMENTS

The present invention provides a solid-state imaging apparatus which performs AD (Analogue to Digital) conversion operations respectively corresponding to a case in which an output from an amplifier configured to perform inversion and amplification is AD-converted, and a case in which the amplifier is bypassed and an output is AD-converted.

In the solid-state imaging apparatus according to the present invention, a plurality of pixels for photo-electrically converting incident light are arranged two-dimensionally in a matrix in a pixel section. Resetting and charge accumulation of a plurality of pixels are performed on a row basis. Outputs from the pixels are output to a column signal line arranged by column. Signals from pixels are read out to a column signal line by row. A column amplifier circuit which amplifies an analog signal from a pixel, and a column circuit which holds an amplified signal are arranged for each column signal line. By amplifying a pixel signal using the column amplifier circuit, the influence of noise generated in a subsequent circuit is reduced relatively to a pixel signal. This enables high-quality shooting at a high S/N ratio. Generally in a solid-state image sensor in which a column amplifier circuit and an AD converter are mounted, a total noise amount $N_{Total}$ when the column amplifier circuit amplifies a pixel signal by a gain of an absolute value "A" can be represented by:

$$N_{Total} = \sqrt{A \cdot N_{Pix}^2 + N_{amp(A)}^2 + N_{ADC}^2} \quad (1)$$

where $N_{Pix}$: random noise of a pixel;

$N_{amp(A)}$: random noise generated in the column amplifier circuit when the gain of the column amplifier circuit is A and $N_{ADC}$: random noise generated in the AD converter. To simplify the description, the gain of the column amplifier circuit is simply A. In equation (1), the random noise $N_{amp(A)}$ of the column amplifier circuit when the gain is A can be generally designed to be smaller than a value $A \cdot N_{amp(1)}$ obtained by amplifying, by A, random noise $N_{amp(1)}$ when the gain of the column amplifier circuit is 1. This is because the high-frequency (treble) cutoff frequency when the column amplifier circuit has a high gain decreases.

When A=1, equation (1) is rewritten into:

$$N_{Total} = \sqrt{N_{Pix}^2 + N_{amp(1)}^2 + N_{ADC}^2} \quad (2)$$

When the gain is 1, the column amplifier circuit need not perform signal amplification. Adversely, if the column amplifier circuit is used, random noise $N_{amp(1)}$ is added to the total noise, as represented by equation (2), increasing the noise. Hence, when the column amplifier circuit does not perform signal amplification, the use of the column amplifier circuit increases noise, compared to the absence of the column amplifier circuit.

First Embodiment

Figure 1:
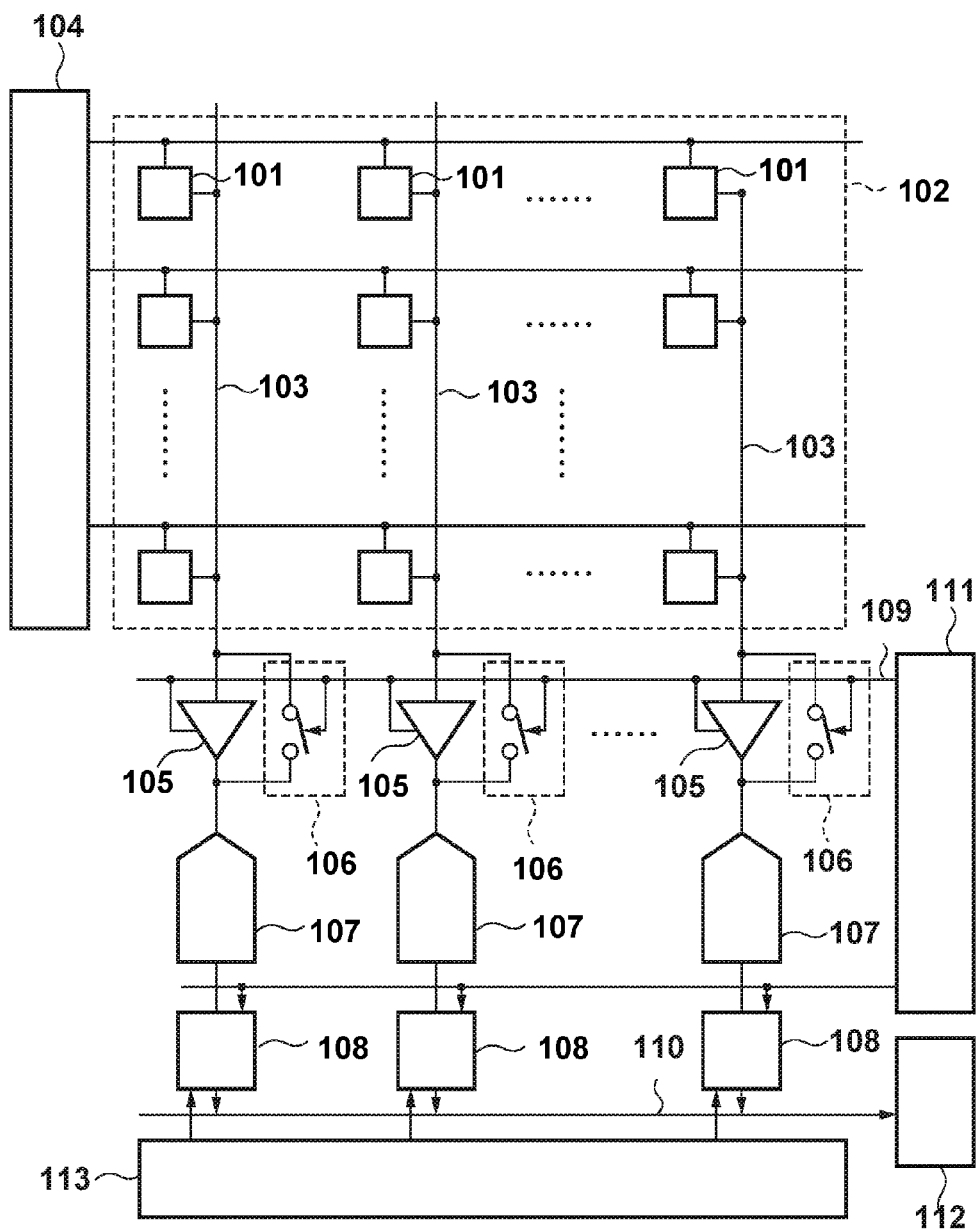
FIG. 1 is a block diagram according to an embodiment.

The first embodiment of the present invention will now be described in detail with reference to the accompanying drawings. FIG. 1 is a block diagram showing the first embodiment. In a pixel section 102, a plurality of pixels 101 are arranged in a matrix of N rows×M columns. The pixel 101 outputs an imaging signal based on incident light by photo-electric conversion. FIG. 1 shows only some pixels 101. Column signal lines 103 output, by row, pixel signals from pixels selected by a row selection unit 104. Column amplifier circuits 105 receive the pixel signals from the column signal lines 103. The column amplifier circuits 105 invert and amplify the input pixel signals, and output the resultant signals to AD conversion circuits 107. Bypass circuits 106 are circuits which cause pixel signals from the column signal lines 103 to bypass the column amplifier circuits 105. A bypass control circuit 111 controls bypassing of pixel signals. Setting circuits 108 are controlled by the bypass control circuit 111 to control an AD conversion operation. A column selection circuit 113 sequentially transfers digital signals processed by the setting circuits 108 to a digital output line 110. A digital processing circuit 112 processes the digital signals transferred to the digital output line 110.

In this arrangement, according to the embodiment, for example, when shooting is performed at a low gain such as the gain=1, AD conversion is executed in a first operation mode in which AD conversion is performed without amplifying a pixel signal from the column signal line 103. When shooting is performed at a high gain of the column amplifier circuit 105, AD conversion is executed in a second operation mode in which a pixel signal amplified by the column amplifier circuit is AD-converted. That is, whether or not to use the column amplifier circuit is selected in accordance with the shooting condition. However, when the column amplifier circuit is constructed by an inverting amplifier circuit, the polarity of a signal and the operating point differ between the case in which the column amplifier circuit is used, and the case in which it is not used. As a result, no appropriate AD conversion may be performed. As a measure against this, the setting circuit 108 which controls the AD conversion operation is arranged to perform appropriate AD conversion depending on whether the column amplifier circuit is bypassed. A setting circuit 108 is included in each column in FIG. 1, but instead a single setting circuit may be included in the digital processing circuit 112 or the AD conversion circuit 107.

Figure 2:
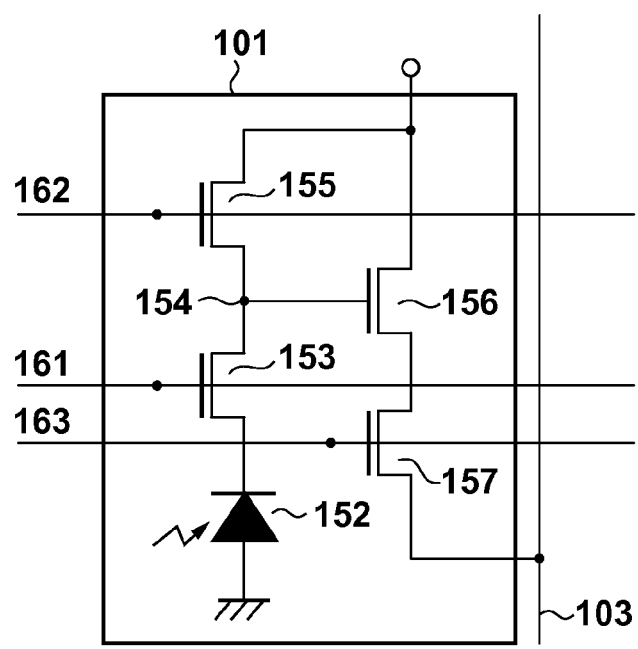
FIG. 2 is a circuit diagram showing the circuit arrangement of a pixel section.

An example of the circuit arrangement of the pixel 101 will be explained with reference to FIG. 2. A photodiode 152 is a photo-electric converter which converts incident light into charges by photo-electric conversion. The source of a transfer transistor 153 is electrically connected to the photodiode 152, the gate is electrically connected to a transfer control line 161, and the drain is electrically connected to a floating diffusion region (to be referred to as a FD region hereinafter) 154. The FD region 154 is a region in which charges transferred from the photodiode 152 via the transfer transistor 153 are held. The source of a reset transistor 155 is electrically connected to the FD region 154, the gate is electrically connected to a reset control line 162, and the drain is electrically connected to a power supply voltage. The gate of an amplifier transistor 156 is electrically connected to the FD region 154, the drain is electrically connected to the power supply voltage, and the source is electrically connected to a selecting transistor 157. The gate of the selecting transistor 157 is electrically connected to a selecting control line 163, the source is electrically connected to the column signal line 103, and the drain is electrically connected to the source of the amplifier transistor 156. The amplifier transistor 156 amplifies a signal based on charges held in the FD region 154, and outputs the amplified signal to the column signal line 103 via the selecting transistor 157. The reset control line 162, transfer control line 161, and selecting control line 163 are electrically connected to the row selection unit 104.

Figure 3:
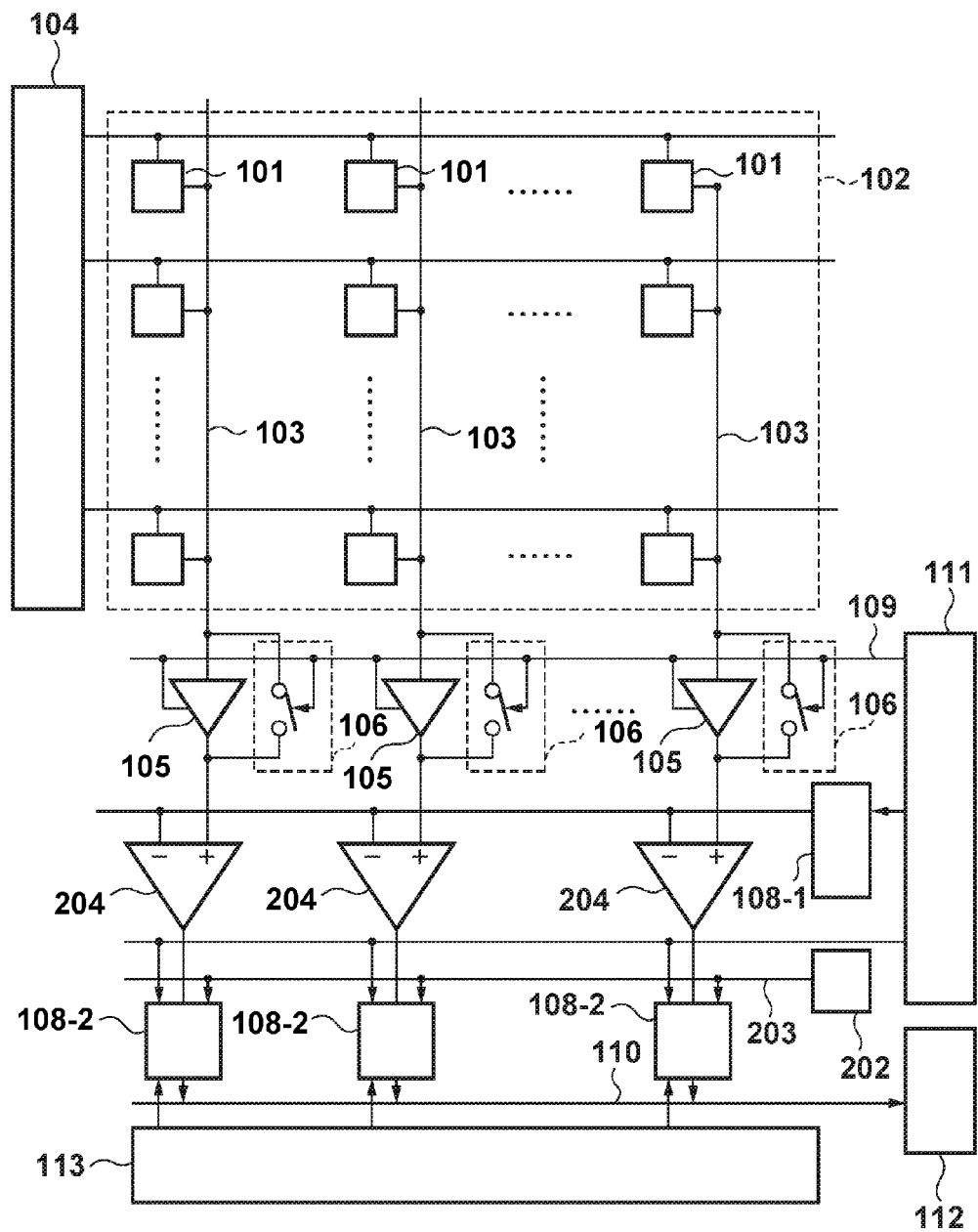
FIG. 3 is a circuit diagram according to the first embodiment.

Next, the operation of the AD conversion circuit 107 will be explained with reference to FIG. 3. In FIG. 3, a description of parts denoted by the same reference numerals as those in FIG. 1 will not be repeated. A comparator 204 compares a voltage at the positive input terminal with a reference signal input to the negative input terminal. The positive input terminal receives an output from the column amplifier circuit 105, or a pixel signal which is input from the column signal line 103 by bypassing the column amplifier circuit 105. When the voltage at the positive input terminal is (equal to or) higher than that at the negative input terminal, the comparator 204 outputs a High level (to be referred to as H level hereinafter). When the voltage at the positive input terminal is lower than that at the negative input terminal, the comparator 204 outputs a Low level (to be referred to as L level hereinafter). The bypass circuit 106 is a circuit which causes a pixel signal from the column signal line 103 to bypass the column amplifier circuit 105. When an output 109 from the bypass control circuit 111 is at H level, the switch of the bypass circuit 106 is turned on to bypass the column amplifier circuit 105 and short-circuit the column signal line 103 and the positive input terminal of the comparator 204. In addition, when the output 109 is at H level, the column amplifier circuit 105 changes to, for example, an inactive state so as to not transmit an output to the positive input terminal of the comparator 204. When the output 109 from the bypass control circuit 111 is at L level, the switch is turned off to input a pixel signal from the column signal line 103 to only the column amplifier circuit 105.

In the embodiment, the setting circuit 108 includes a ramp signal generation circuit 108-1 and latch memory circuit 108-2. The driving methods and processing methods of the ramp signal generation circuit 108-1 and latch memory circuit 108-2 change in accordance with a signal from the bypass control circuit 111. In the embodiment, the ramp signal generation circuit 108-1 and latch memory circuit 108-2 are parts which compensate for a change of the polarity of a pixel signal and a shift of the operating point that occur between a case in which the column amplifier circuit is used and a case in which it is not used. The ramp signal generation circuit 108-1 generates a ramp signal serving as a reference signal. The ramp signal generation circuit 108-1 has a function of changing the polarity of the slope of a ramp signal to be generated with respect to the temporal change. The ramp signal generation circuit 108-1 changes the polarity of the slope of a ramp signal in accordance with a control signal from the bypass control circuit 111. The "polarity of the slope" of the ramp signal with respect to the temporal change means an increase or decrease in the signal level of the ramp signal with respect to the lapse of time.

The latch memory circuit 108-2 is a memory circuit which latches and stores a count value 203 output from a counter 202 at the timing when an output from the comparator 204 is inverted. The latch memory circuit 108-2 changes the timing to hold the count value 203, in correspondence with a control signal from the bypass control circuit 111, based on whether an output from the comparator 204 is inverted from H level to L level, or if it is inverted from L level to H level. A method of driving the solid-state imaging apparatus exemplified in FIGS. 2 and 3 will be explained with reference to timing charts shown in FIGS. 4A and 4B. In the description of the circuit of FIG. 2, the source electrode and drain electrode of a MOS transistor are electrically connected when the H level is applied to the gate electrode, and are electrically disconnected when the L level is applied to the gate electrode. If a MOS transistor of a type in which the source electrode and drain electrode are electrically connected when a L-level pulse is applied to the gate electrode is used, the same operation as that in the embodiment can be performed by reversing the H and L levels of pulses shown in FIGS. 4A and 4B.

FIG. 4A is a timing chart when the column amplifier circuit is bypassed. FIG. 4B is a timing chart when the column amplifier circuit is used to amplify a signal. In FIGS. 4A and 4B, PSEL, PTX, and PRES represent the states of the selecting control line 163, transfer control line 161, and reset control line 162, respectively. An operation in the method of driving the solid-state imaging apparatus according to the embodiment will be explained in detail sequentially from time t0 with reference to the timing charts of FIGS. 4A and 4B.

First, an example when a signal from a pixel bypasses the column amplifier circuit 105 will be described with reference to FIG. 4A. FIG. 5 is a circuit diagram showing the column amplifier circuit 105. For reference, the bypass circuit 106 is also illustrated. The column amplifier circuit 105 is constituted by an inverting amplification source-grounded circuit. The column amplifier circuit 105 inverts and amplifies a signal input to an input terminal 502, and outputs the resultant signal from an output terminal 503. At time to, an output V109 from the bypass control circuit 111 changes to H level to disconnect (turn off) a MOS transistor series-connected to a source-grounded amplifier MOS transistor. At this time, the switch of the bypass circuit 106 is turned on. A pixel signal from the column signal line 103 appears at the output terminal 503 from the input terminal 502, and is input to the positive input terminal of the comparator 204. A switch PCOR is a switch for resetting a capacitive element. In the timing of the timing chart shown in FIG. 4A, the switch PCOR keeps ON from time t0 to time t2, and in a subsequent period, keeps OFF (not shown). The switch PCOR may suffice to be turned off after time t1 and before time t2.

At time t0, the selecting control line PSEL for selecting a row subjected to readout in the pixel section changes to H level to turn on the selecting transistor 157 and select a readout row. Also, the reset control line changes to H level to turn on the reset transistor 155 and reset the FD region 154. Next, at time t1, the reset control line changes from H level to L level to turn off the reset transistor 155 and hold the FD region 154 at the reset level. In response to this, a voltage V103 of the column signal line 103 changes to the reset level at time t1. An output from the column signal line 103 is stabilized by time t2, so AD conversion of the reset level starts from time t2.

At this time, in FIG. 4A, the output voltage V109 of the output 109 from the bypass control circuit 111 is at H level, and the column amplifier circuit is bypassed. Hence, a voltage V204+ of the positive input terminal of the comparator 204 changes to the reset level of V103. In FIG. 4A, in correspondence with a signal from the bypass control circuit 111, the slope of a ramp signal generated by the ramp signal generation circuit 108-1 has a negative polarity at which a voltage V204− decreases over time from time t2. Simultaneously when a ramp signal is generated, the counter 202 starts counting and a counter value D203 changes. A temporal change of the counter value is schematically shown as D203. When the magnitude relationship between the voltage V204− and the voltage V204+ is reversed at time t3, an output V204o from the comparator is inverted, and the latch memory circuit 108-2 holds a counter value at this time. The held value is the AD conversion result of the reset level. The AD conversion of the reset level ends at t4, and the ramp signal changes to an initial value.

Then, at t5, PTX changes to H level to turn on the transfer transistor 153 and transfer charges generated in the photodiode 152 to the FD region 154. At time t6 at which the signal level is stabilized, PTX changes to L level to end the transfer. The transferred charges are converted into an imaging signal, and the imaging signal is output to the column signal line 103. Hence, a voltage V204+ of the positive input terminal of the comparator 204 changes to the imaging signal level of V103. At time t7, AD conversion of the imaging signal starts. At time t8, an output from the comparator 204 is inverted, and the counter value D203 at this time is held as the AD conversion result of the signal level in the latch memory circuit 108-2. A difference A (shown at the right end of D203 in FIG. 4A) between the held value of the reset level and the held value of the imaging signal serves as an AD conversion result having undergone CDS (Correlated Double Sampling) processing. This differential processing may be performed by the latch memory circuit 108-2 or the digital processing circuit 112. Since a ramp signal is generated with a negative slope with respect to the reset level, the reset level can be AD-converted within a short time. The time taken for AD conversion of the reset level is shorter than the time taken for AD conversion of the imaging signal. Thus, the ramp signal generation time when the reset level is AD-converted can be shortened.

Next, an example in which an output from the column amplifier circuit is AD-converted will be explained with reference to FIG. 4B. Note that a description of the same operation as that in FIG. 4A will not be repeated. In this case, the output 109 from the bypass control circuit 111 is at L level, the switch of the bypass circuit 106 is turned off, and the column amplifier circuit 105 operates to invert and amplify a pixel signal from the column signal line 103. The polarity of the inverted/amplified signal output from the column amplifier circuit is opposite to that in FIG. 4A. The bypass control circuit 111 controls the ramp signal generation circuit 108-1 to generate a ramp signal with a slope opposite to that in the case of FIG. 4A.

The ramp signal generation circuit 108-1 starts generating a ramp signal whose polarity of the slope temporally changes in the positive direction from time t2. The generated ramp signal is input to the negative input terminal of the comparator 204. At this time, a reset-level voltage amplified by the column amplifier circuit 105 is input to the positive input terminal of the comparator 204. At time t3, an output from the comparator 204 is inverted at the timing when the magnitude relationship between the input voltage V204− and the input voltage V204+ is reversed at time t3. The latch memory circuit 108-2 holds a counter value at this time as the reset level. After that, an output obtained by amplifying an imaging signal by the column amplifier circuit 105 is similarly AD-converted. The latch memory circuit 108-2 holds a counter value at the timing of t8.

As described above, in FIG. 4A, a counter value is held when a comparator output V204o is inverted from H level to L level. Conversely, at the timing in FIG. 4B, a counter value is held when a comparator output V204o is inverted from L level to H level. In FIG. 4B, an AD conversion output having undergone CDS processing can be obtained as a difference B (shown at the right end of D203 in FIG. 4B) between the AD conversion result of the reset level and the AD conversion result of the imaging signal. In the embodiment, as is apparent from FIGS. 4A and 4B, a signal B obtained by AD-converting a signal amplified by the column amplifier circuit 105 is almost two times larger than a signal A which has been AD-converted without amplification. This is because a signal from a pixel is amplified by the gain of the column amplifier circuit 105. The amplification factor is not limited to two times. In the embodiment, the setting circuit 108 controls, in accordance with the output 109 from the bypass control circuit 111, the polarity of the slope of the ramp signal, and latching when the output of comparator 204 changes from H level to L level or when it changes from L level to H level. Control by the setting circuit 108 based on the output 109 from the bypass control circuit 111 is not limited to this.

In the embodiment, the polarity of an input signal to the comparator 204 is reversed depending on whether the column amplifier circuit is bypassed. The polarity of the ramp signal is changed to increase the processing efficiency when performing CDS processing. In the embodiment, an increase in the time taken for AD conversion of the reset level is suppressed by switching a temporal change of the polarity of the slope of the ramp signal between the positive direction and the negative direction by the ramp signal generation circuit 108-1.

From the relationship between equations (1) and (2), when the gain is almost 1, the influence of noise can be reduced by bypassing the column amplifier circuit and digitally obtaining a gain. For example, when the gain of the column amplifier circuit is 4.4 or 2.2, a column amplifier is used. When the gain is set to 1.1, the column amplifier is bypassed to perform AD conversion, and the gain of 1.1 is digitally obtained. A change of the AD conversion operation is performed by the setting circuit 108 by column in the embodiment, but may be performed by the digital processing circuit 112.

Second Embodiment

Figure 6:
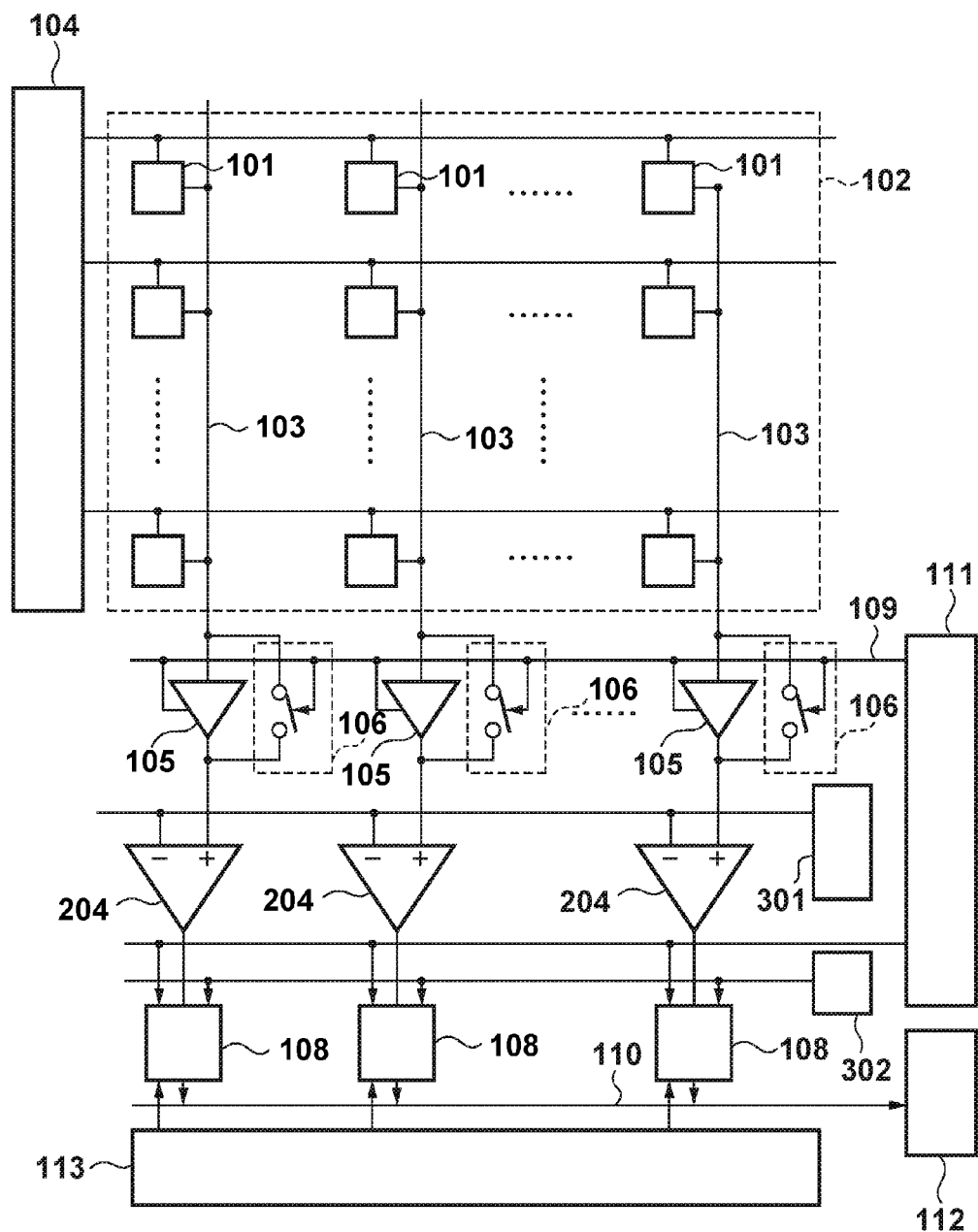
FIG. 6 is a circuit diagram according to the second embodiment.

FIG. 6 is an exemplary circuit diagram according to the second embodiment. FIGS. 7A and 7B are timing charts according to the second embodiment. In FIGS. 6, 7A, and 7B, the same reference numerals as those in FIGS. 3, 4A, and 4B denote common parts, and a description thereof will not be repeated. A ramp signal generation circuit 301 generates a ramp signal. In the description of the second embodiment, the polarity of the slope of the ramp signal is not changed. The second embodiment will be explained with reference to FIGS. 6, 7A, and 7B. A clock generator 302 generates a clock, and the generated clock is supplied to a setting circuit 108. The setting circuit 108 includes an up/down counter. The counting procedures of the up/down counter are changed in synchronism with control of a bypass control circuit 111. The operation of a counter in a period from t2 to t3 and a period from t7 to t8 is changed depending on which of counting-up and counting-down is performed by the up/down counter for counting. The period from t2 to t3 is a period in which AD conversion of the reset level is performed. The period from t7 to t8 is a period in which AD conversion of the imaging signal is performed.

An operation when a column amplifier circuit 105 is bypassed will be described first with reference to FIG. 7A. First, the up/down counter performs AD conversion of the reset level. The up/down counter starts counting-up at time t2, and stops the counting at timing t3 when a ramp signal V204− exceeds a reset level V204+ and a comparator 204 outputs an inverted output. Then, AD conversion of the imaging signal is performed from time t7. The up/down counter changes counting-up to counting-down to perform counting, and stops the counting at time t8. As a result, a count value A (shown at the right end of D203 in FIG. 7A) obtained by the up/down counter reflects the difference between the imaging signal and the reset level. That is, the count value of the up/down counter reflects the result of AD conversion of the imaging signal having undergone CDS processing.

Next, a case in which the column amplifier circuit 105 amplifies a pixel signal will be explained with reference to FIG. 7B. In the embodiment, first, the reset level is AD-converted by counting-down (from t2 to t3). Thereafter, a pixel signal amplified by the column amplifier circuit is counted up (from t7 to t8). By controlling counting-up and counting-down of the up/down counter in this manner, the influence of inversion and amplification of the pixel signal by the column amplifier circuit is taken into consideration. Therefore, an AD conversion result reflecting the result of CDS processing can be obtained as a count value B (shown at the right end of D203 in FIG. 7B). In the embodiment, AD conversion is performed by controlling the counting direction of the up/down counter without changing the polarity of the slope of the ramp signal. However, a change of the polarity of the slope of the ramp signal and a change of the counting direction of the up/down counter may be combined in accordance with bypass control of the column amplifier circuit. For example, an increase in the time taken for AD conversion of the reset level can be suppressed by changing the slope of the ramp signal to be negative, and performing AD conversion, as shown in FIG. 4A. In this case, the up/down counter first counts the reset level by counting-down, and then counts the signal level by counting-up, obtaining an AD conversion result as the count value. In the embodiment, the order of counting-up and counting-down of the up/down counter is changed between the first operation mode and the second operation mode.

Third Embodiment

Figure 8:
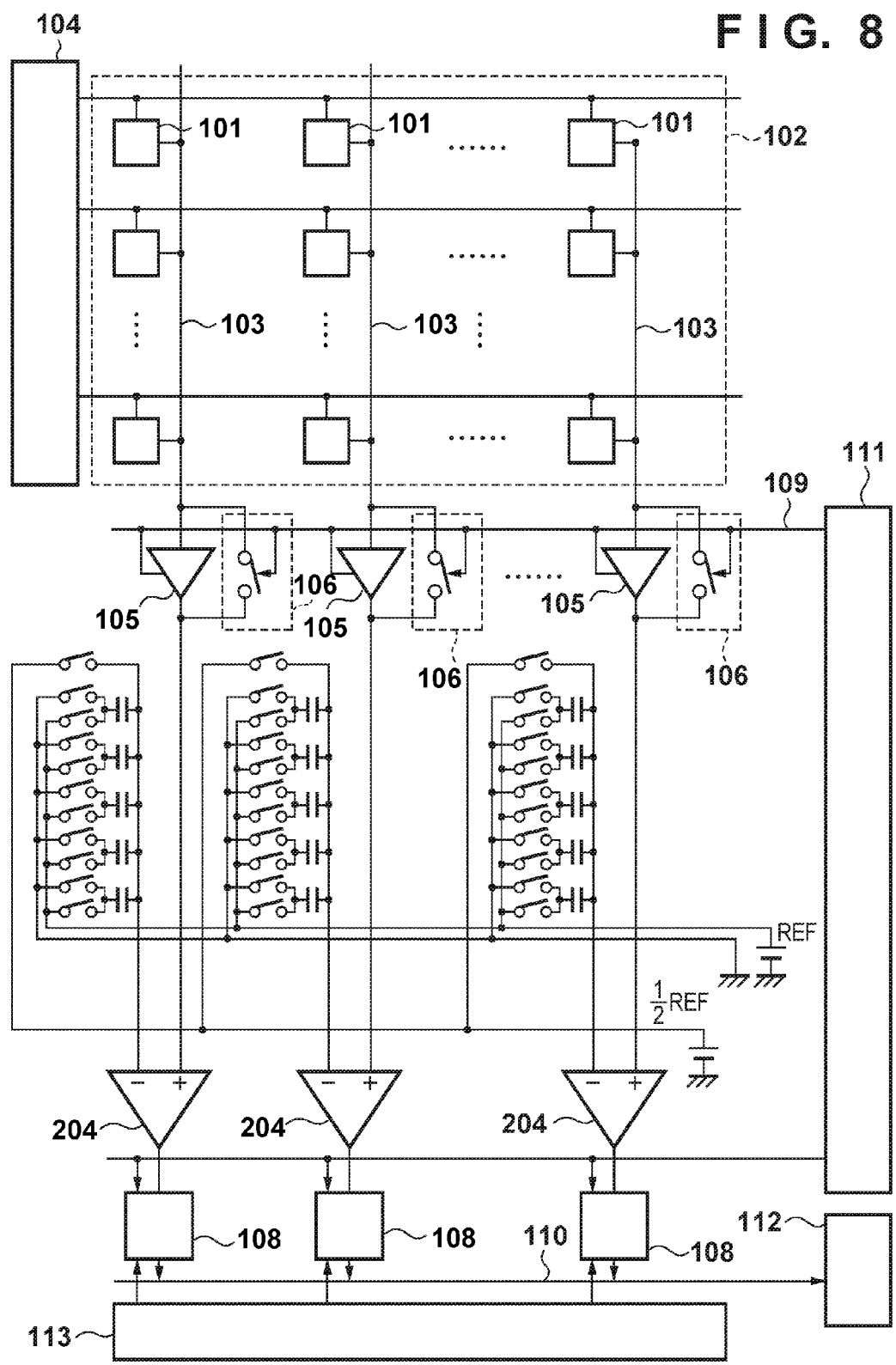
FIG. 8 is a circuit diagram according to the third embodiment.
Figure 9A:
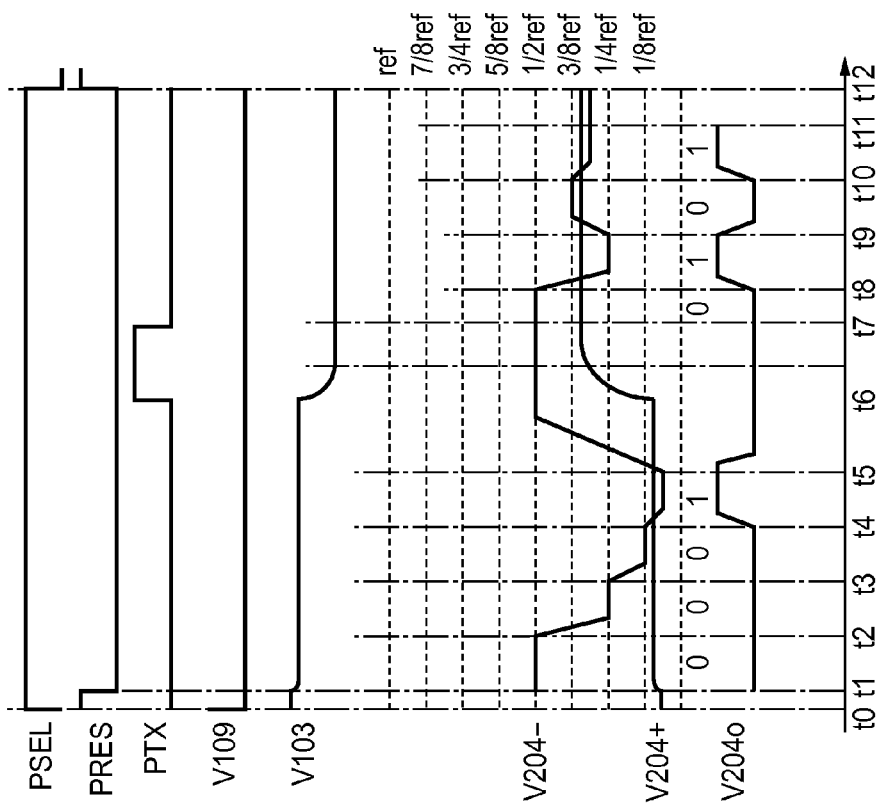
FIGS. 9A and 9B are timing charts exemplifying a driving method according to the third embodiment.
Figure 9B:
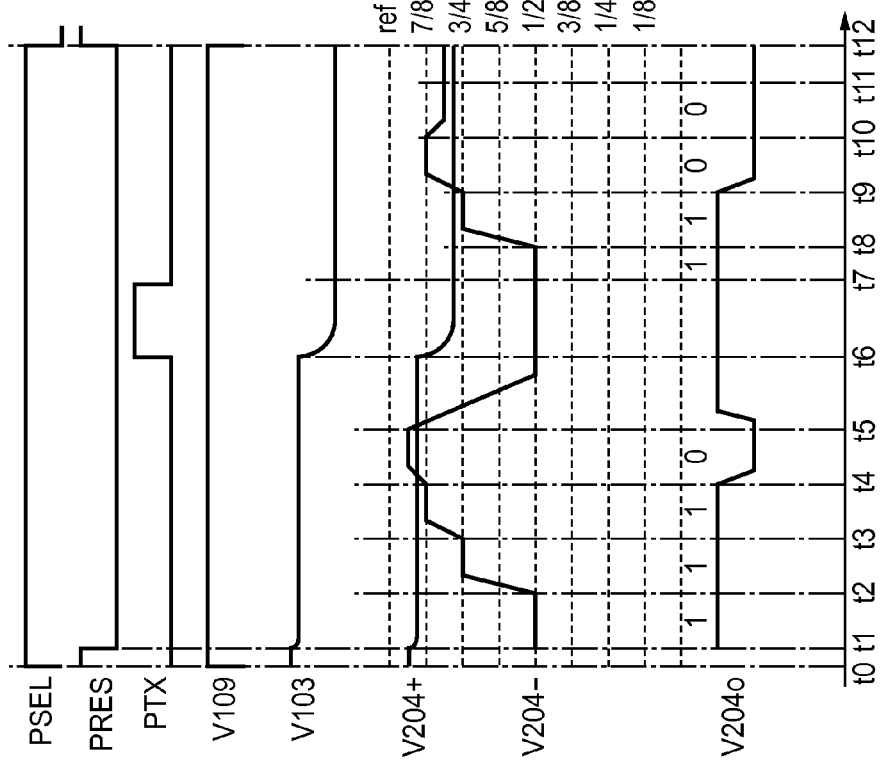

Next, an embodiment of a successive approximation AD converter will be described with reference to FIGS. 8, 9A, and 9B. In FIGS. 8, 9A, and 9B, the same reference numerals as those in FIGS. 3, 4A, and 4B denote common parts, and a description thereof will not be repeated. Also, a description of parts having the same operations as those in the other embodiments will not be repeated. The successive approximation AD converter includes comparators 204, and binary weight capacitors, capacitance value C to 8C each connected to the negative input terminal of the corresponding comparator 204. The other terminal of each of the binary weight capacitors, capacitance value C to 8C is connected to a switch which switches between the ground voltage and the REF voltage. The switch is controlled by a control means. The binary weight capacitors, capacitance value C to 8C, the switches, and the comparators 204 form the successive approximation AD converter. The output of each comparator 204 is connected to a corresponding setting circuit 108. The comparator 204 compares a voltage at the positive input terminal with a voltage at the negative input terminal. The comparator 204 outputs H level when the voltage at the positive input terminal is higher than that at the negative input terminal, and L level when the voltage at the positive input terminal is lower than that at the negative input terminal. First, a case in which a column amplifier circuit 105 is bypassed will be described with reference to FIG. 9A. At time t1 to time t5, AD conversion of the reset level is performed. Every time the switch selects the binary weight capacitor, the successive approximation AD converter compares voltages at the input terminals of the comparator 204, and stores the obtained comparison result in the setting circuit 108. An imaging signal is transferred from time t6. After the level of the imaging signal is stabilized, AD conversion of the imaging signal starts, and the AD conversion is performed from t7 to t11. The difference between the AD conversion result of the imaging signal and the AD conversion result of the reset level is calculated, obtaining an AD conversion result after CDS processing. The output digital value of the AD conversion result of the reset level at the timing in FIG. 9A becomes 1110=14, and the output digital value of the AD conversion result of the imaging signal becomes 1100=12. The CDS processing unit of the setting circuit 108 performs differential processing, obtaining 14−12=2 as the AD conversion output of the imaging signal. To the contrary, in the case of FIG. 9B in which an output from the column amplifier circuit 105 is AD-converted, the output digital value of AD conversion of the reset level becomes 0001=1, and the output digital value of AD conversion of the signal level becomes 0101=5. The CDS processing unit performs differential processing between the reset level and the signal level, obtaining 5−1=4 as the AD conversion output result.

Based on an output signal from a bypass control circuit 111, the setting circuit 108 changes the differential processing of the AD conversion processing circuit to subtraction of the signal level from the reset level, or subtraction of the reset level from the signal level. A change of the differential processing is performed by the setting circuit 108 in the embodiment, but may be performed by a digital processing circuit 112.

Further, the embodiment has employed the successive approximation AD converter, but the AD conversion method is not limited to this. For example, a hybrid method of two AD conversion methods using a ΣΔ AD converter and cyclic comparison AD converter may be adopted. In this case, when performing both AD conversion of the reset level and AD conversion of the signal level to calculate a difference, differential processing can be properly performed by changing processing after AD conversion or the AD conversion method depending on the presence/absence of bypassing of the column amplifier circuit.

Fourth Embodiment

Figure 10:
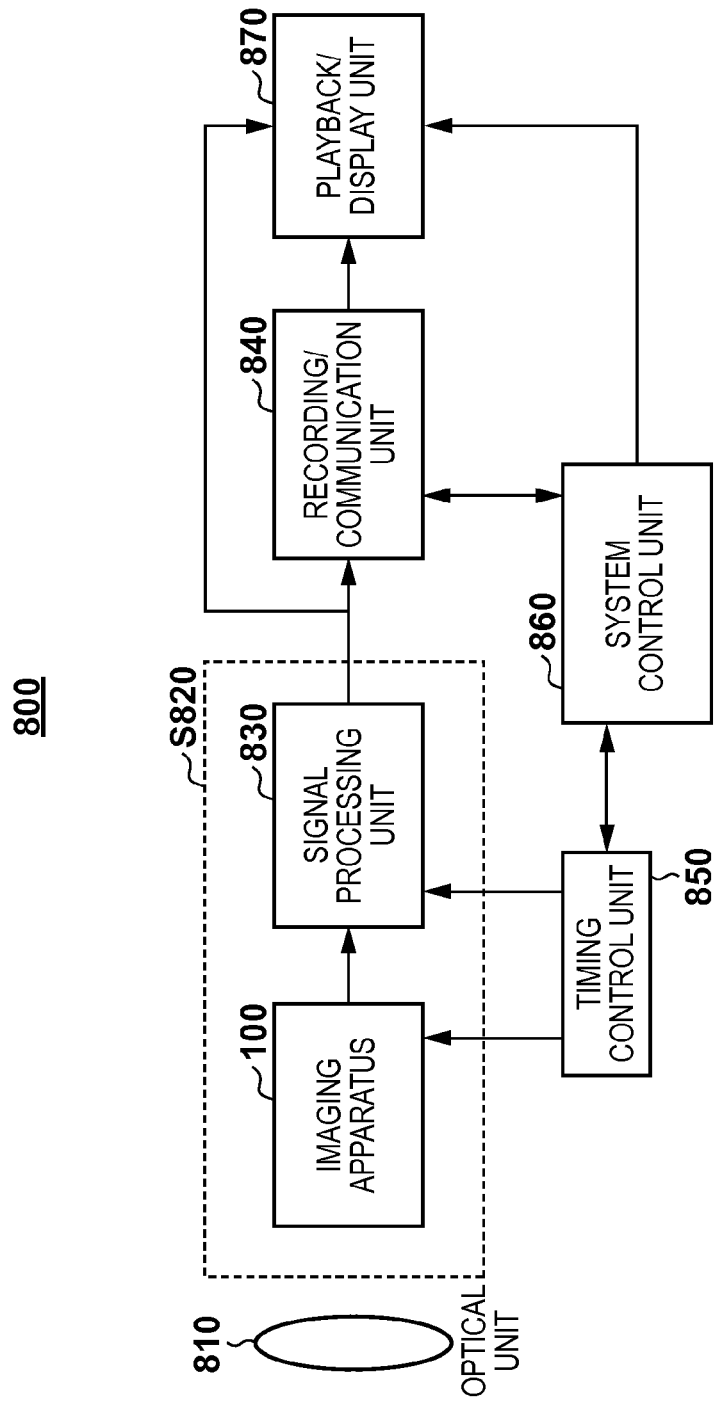
FIG. 10 is a block diagram showing an example of the arrangement of an imaging system using an imaging apparatus.

FIG. 10 is a block diagram showing an example of the arrangement of an imaging system according to the fourth embodiment of the present invention. An imaging system 800 includes, for example, an optical unit 810, imaging apparatus 100, signal processing unit 830, recording/communication unit 840, timing control unit 850, system control unit 860, and playback/display unit 870. An imaging unit 820 includes the imaging apparatus 100 and video signal processing unit 830. As the imaging apparatus 100, the solid-state imaging apparatus described in each of the above embodiments is used.

The optical unit 810 serving as an optical system, such as a lens, forms an image by forming light traveling from an object into an image on a pixel section 102 of the imaging apparatus 100 in which a plurality of pixels are two-dimensionally arrayed. At a timing based on a signal from the timing control unit 850, the imaging apparatus 100 outputs a signal corresponding to the light formed into an image on the pixel section 102. The signal output from the imaging apparatus 100 is input to the signal processing unit 830, and the signal processing unit 830 performs signal processing according to a method defined by a program or the like. The signal obtained by processing by the signal processing unit 830 is sent as image data to the recording/communication unit 840. The recording/communication unit 840 sends, to the playback/display unit 870, a signal for forming an image, and causes the playback/display unit 870 to play back and display a moving image or still image. Also, the recording/communication unit 840 communicates with the system control unit 860 in response to a signal received from the video signal processing unit 830. In addition, the recording/communication unit 840 performs an operation of recording, on a recording medium (not shown), a signal for forming an image.

The system control unit 860 performs centralized control of the operation of the imaging system, and controls driving of the optical unit 810, timing control unit 850, recording/communication unit 840, and playback/display unit 870. The system control unit 860 includes a storage device (not shown) serving as, for example, a recording medium, on which a program or the like necessary to control the operation of the imaging system is recorded. The system control unit 860 supplies, into the imaging system, a signal for switching the driving mode in accordance with, for example, a user operation. Examples are a change of a readout row or a row to be reset, a change of the angle of view along with electronic zooming, and a shift of the angle of view along with electronic image stabilization. The timing control unit 850 controls the driving timings of the imaging apparatus 100 and signal processing unit 830 under the control of the system control unit 860.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-192366, filed Sep. 17, 2013, which is hereby incorporated by reference herein in its entirety.

What is claimed is:

1. A solid-state imaging apparatus comprising:
a pixel section in which a plurality of pixels are arranged in a matrix;

a column signal line configured to output a pixel signal from the pixel section;

a column amplifier circuit configured to output an amplified signal by inverting and amplifying the pixel signal;

a bypass circuit configured to bypass the column amplifier circuit;

an analogue to digital (AD) converter; and a control unit configured to change an operation mode of the AD converter, wherein the AD converter includes a ramp signal generation circuit configured to generate a reference signal, a comparator configured to compare the reference signal and one of the pixel signal and the amplified signal, and a counter configured to count a time and output a count value corresponding to the time, and the control unit is configured:

in a first operation mode, to control the AD converter to AD-convert the pixel signal output from the column signal line via the bypass circuit, in a second operation mode, to control the AD converter to AD-convert the amplified signal, and to change one of a slope of a reference signal and a counting procedure of the counter between the first operation mode and the second operation mode.

2. The solid-state imaging apparatus according to claim 1, wherein a polarity of the slope of the reference signal is changed.

3. The solid-state imaging apparatus according to claim 1, wherein the counting procedure of the counter includes counting-up and counting-down.

4. The solid-state imaging apparatus according to claim 1, wherein the AD converter AD-converts a signal of a reset level of the pixel, and an imaging signal obtained by photo-electrically converting light.

5. The solid-state imaging apparatus according to claim 1, wherein the AD converter AD-converts a signal based on a reset level of the pixel signal, and an imaging signal obtained by photo-electrically converting light, and when the signal based on the reset level and the imaging signal are AD-converted, a polarity of the slope of the ramp signal is changed.

6. The solid-state imaging apparatus according to claim 1, wherein the AD converter AD-converts a signal based on a reset level of the pixel signal, and an imaging signal obtained by photo-electrically converting light, and when the signal based on the reset level and the imaging signal are AD-converted, an order to perform counting-up and counting-down of the counter is changed.

7. The solid-state imaging apparatus according to claim 1, wherein the control unit controls the bypass circuit to cause the pixel signal from the column signal line to bypass the column amplifier circuit.

8. An imaging system comprising:

a solid-state imaging apparatus;

an optical system configured to form an image on the solid-state imaging apparatus; and a signal processing circuit configured to process an output signal from the solid-state imaging apparatus, the solid-state imaging apparatus comprising:

a pixel section in which a plurality of pixels are arranged in a matrix;

a column signal line configured to output a pixel signal from the pixel section;

a column amplifier circuit configured to output an amplified signal by inverting and amplifying the pixel signal;

a bypass circuit configured to bypass the column amplifier circuit;

an analogue to digital (AD) converter; and a control unit configured to change an operation mode of the AD converter, wherein the AD converter includes a ramp signal generation circuit configured to generate a reference signal, a comparator configured to compare the reference signal and one of the pixel signal and the amplified signal, and a counter configured to count a time and output a count value corresponding to the time, and the control unit is configured:

in a first operation mode, to control the AD converter to AD-convert the pixel signal output from the column signal line via the bypass circuit, in a second operation mode, to control the AD converter to AD-convert the amplified signal, and to change one of a slope of a reference signal and a counting procedure of the counter between the first operation mode and the second operation mode.

* * * * *